June 27, 1944. E. H. FERNALD 2,352,313
GAUGE
Filed June 9, 1942
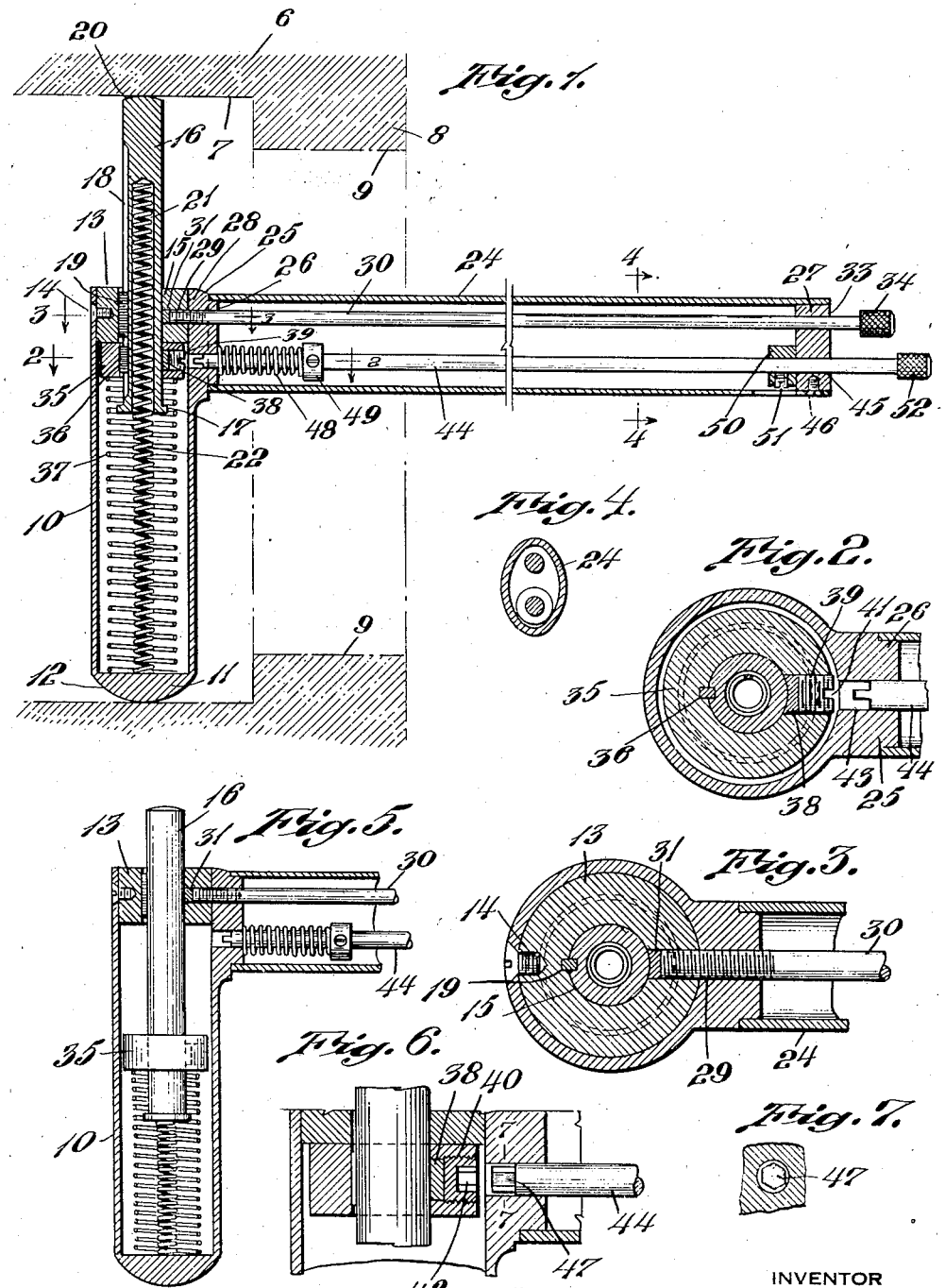
INVENTOR
Everett H. Fernald
BY Barlow & Barlow
ATTORNEYS Patented June 27, 1944

2,352,313

UNITED STATES PATENT OFFICE 2,352,313

GAUGE

Everett H. Fernald, Smithfield, R. I.

Application June 9, 1942, Serial No. 446,339

10 Claims. (Cl. 33—143)

This invention relates to a gauge of the type used for measurement of a bore, and from which the gauge, after being set, is taken and its dimension determined.

The usual type of bore gauge which is in use at the present time cannot be used for the measurement of a bore which has a restricted entrance opening, as the setting of the gauge must be changed in order to remove the gauge from the opening, and accordingly some other type of gauge than the hand gauge usually present in the workman's tool kit must be utilized.

One of the objects of this invention is to provide a simple gauge such as would be carried in the workman's tool kit wherein the gauging of the bore may be had notwithstanding the fact that the bore has a restricted opening and the gauge must be collapsed in order to remove the gauge through the restricted opening.

Another object of the invention is to utilize a clamping screw for holding the telescopic parts of the gauge in adjusted position, or holding the parts collapsed while removed and then permitting them to be returned to a predetermined position to which some operative part has been set.

Another object of this invention is to provide an arrangement of handles so that even though the telescopic parts of the gauge are hidden the axial direction of these parts may be known.

With these and other objects in view, the invention consists of certain novel features of construction, as will be more fully described and particularly pointed out in the appended claims.

In the accompanying drawing:

Fig. 1 is a sectional view illustrating a restricted opening bore in which the device is positioned to determine the diameter thereof;

Fig. 2 is a section on line 2—2 of Fig. 1;

Fig. 3 is a section on line 3—3 of Fig. 1;

Fig. 4 is a section on line 4—4 of Fig. 1;

Fig. 5 is a sectional view of a fragmental portion of the device, showing one position of its operation;

Fig. 6 is a fragmental sectional view with a slightly modified arrangement of collar securing means; and Fig. 7 is a section on substantially line 7—7 of Fig. 6.

The usual bore gauge has two telescopic parts with a handle extending from the outer part and some means in this handle for holding the parts, which telescope into the outer part, in a selected adjusted position to which it may extend when positioned in an internal bore. However, in the use of such an instrument it is necessary to release the telescopic parts in order to get the instrument out of a bore which has a restricted opening, and accordingly measurement of the bore cannot be had with such an instrument. To overcome this difficulty I have provided a collar which may be secured to the inner telescopic member which will permit the inner member to be forced inwardly and there clamped, thus permitting the inner telescopic member to be moved inwardly although restricted in its outward movements to the diameter of the bore which is gauged, and I utilize the usual clamping member for holding the inner telescopic member in its contracted position so that when so contracted the gauge may be removed from the bore and thereafter this clamping means may be released so that the inner telescopic member may move out to the position which it did assume when in true gauging position of the bore. Thus, I provide a gauge which may be utilized for measuring a bore even though it may have a restricted opening.

With reference to the drawing, I have illustrated at 6 a block having a bore 7 therein with overhanging portion 8 providing a restricted opening 9, it being desired to gauge the bore 7 and yet remove the gauge from the bore. A dial gauge is usually necessary for the performance of such a gauging operation, but with my arrangement the ordinary gauge carried by the workman in his kit may be utilized.

I provide a body member 10 of tubular construction closed at one end 11 and having a rounded outer surface 12 which may engage one of the walls of the bore 7. In the opposite end of this tubular member 10 I provide a block 13 which is held in position by a set screw 14. A bearing opening 15 is located centrally of the block and serves to slidably guide the head member 16 having a flange at one end 17 and provided with a key way 18 in which the key 19 in the block 13 slidably engages. Thus this head member 16 is prevented from rotation relative to the body member 10 while being slidable relative thereto. The outer end 20 of this head member 16 is curved and serves to engage the opposite wall of the bore 7. A central bore 21 extends axially of this head member 16 and receives a compression spring 22 which engages one end of the bore 21 and engages the end of wall 11 of the body member so as to force these two members outwardly into an expanded position.

A handle 24 of elliptical shape as shown in Fig. 4 extends from the enlarged portion 25 of the body member by fitting over a boss 26 extending therefrom. The longitudinal axis of this elliptical handle extends in the direction of the axis of the telescopic members 10 and 16 so that by merely holding the handle and feeling the direction of extent of the major axis of this elliptical handle one may know the direction in which the telescopic members extend. The closure guide plug 27 is fitted in the outer end of the handle.

Registering openings 28 in the body member and 29 in the plug 13 receive a rod 30 which extends longitudinally through the tubular handle 24 and bears against a shoe 31. The end of this rod 30 is threaded while the bores in which it is received are also threaded so that by turning this rod 30 in these registering openings 28 and 29, pressure will be brought to bear on the shoe 31 to cause it to press against the head member 16 and bind it against movement under influence of its spring 22. A bearing opening 33 in the closure plug 27 also serves to guide this rod 30 in its movement, while the outer end of the rod 34 is provided with a knurled enlargement serving as a handle for turning the same.

A collar 35 embraces the head member 16 and is located within the tubular body. A key 36 carried by this collar extends into the key way 18 of the head 16 so as to slidably relate these two parts. A spring 37 engages the end wall 11 of the tubular body and also this collar so as to force the collar against the bearing plug 13. A radial bore exists opposite the key 36 in which there is located a shoe 38 and against which a threaded plug 39 contacts and has threaded engagement with this radial bore. This plug is slotted as shown in Fig. 1 as at 41 (see Fig. 2) or it may have a hexagonal opening 42 as shown in Fig. 6. If this plug 39 is turned it will press against the shoe 38 and cause this collar to be bound in an adjusted position on the head member 16. A hole 43 is located in the thickened portion 25 in such a position as to register with the threaded set screw 39 when the collar is in engagement with the plug 13. A rod 44 has one end portion guided in this opening 43 while its other portion extends through the handle and is guided in this opening 45 in the closure plug 27 which is held in the handle by the set screw 46.

The inner end of this rod 44 is suitably shaped to fit the opening or slot 41 or the hexagonal opening 42 as shown at 47 in Fig. 7 while a spring 48 pressing against the collar 49 fixed on the rod 44 moves this rod outwardly away from engagement with this recessed part of this threaded plug 39. The rod is limited in its outward movement by a collar 50 held in position by a set screw 51 which engages the inner side of the closure plug 27. This rod is likewise provided with an enlarged knurled part 52 which serves as a handle for manipulating this rod, such for instance as by forcing it inwardly against the spring 48 until its reduced end engages the corresponding shaped opening and then by turning, this plug 39 may be forced inwardly, to cause the collar to be bound upon the head member 16.

In use the gauge may be inserted through the restricted opening 9 by first clamping the head member 16 in contracted position. Thereafter the handle 34 may be manipulated to release the head member 16 and the device moved until the true gauging position of the largest diameter of the bore is attained. The elliptical shape of this handle will assist in determining this position. When this position has been reached, such for instance as shown in Fig. 1, the parts will be in the position shown in Fig. 1, and the rod 44 may be pressed inwardly to cause the reduced end thereof to engage the slot 41 in the collar plug so as to tighten up this plug and press the shoe against the head 16 to bind the collar thereon. The head member 16 now by movement of the handle may be collapsed into the body 10 to an extent such as shown in Fig. 5 and when so collapsed the handle 34 may be turned to cause the shoe 31 to bind against the head member 16 and thus the head member retained in the position shown in Fig. 5. In this contracted position the gauge may be removed from the bore through the restricted opening 13 and thereafter the hand of the operator may engage the head 16 and the releasing rod 30 turned by means of handle 34 to permit this rod to move outwardly until the collar 35 engages the bearing plug 13 which provides a stop. This position being acquired by means of a spring forcing the collar and the head member 16 outwardly. When the collar 35 engages this bearing member 13 the gauge will be in exactly the position in which it was when in the bore, that is, the position shown in Fig. 1, and the true measurement between the curved ends 12 and 20 may then be had and the accurate measurement of the bore determined.

I claim:

1. In a bore gauge, a body member having a bearing in one end thereof, a head member telescopically slidable therein through the bearing, a spring urging said members outwardly with reference to each other, means extending through said bearing and engaging the head member to hold the members in adjusted position, abutment means within said body member and embracing said head, and means to bind the abutment member to the head in an adjusted position thereon.

2. In a bore gauge, a body member having a bearing in one end thereof, a head member telescopically slidable therein through the bearing, a spring urging said members outwardly with reference to each other, means engaging the head member to hold the members in adjusted position, a collar within the body member loosely embracing the head member, a spring urging the collar member into engagement with the said bearing, means carried by the collar for binding the collar on said head member, whereby to limit the outward movement of the head member but permit inward movement thereof.

3. In a bore gauge, a body member having a bearing opening in one end thereof, a head member telescopically slidable in the bearing of said body member, a handle fixed to the body member and extending laterally from said members at said bearing, a spring for expanding the members, means operable through said handle to hold the members in adjusted position, a collar slidable on said head member, securing means carried by the collar for binding it on said head member, and retractable means in said handle for operatively engaging said securing means.

4. In a bore gauge, a body member having a bearing opening in one end thereof, a head member telescopically slidable in the bearing of said body member, a handle fixed to the body member and extending laterally from said members at said bearing, a spring for expanding the members, means operable through said handle to hold the members in adjusted position, a collar slidable on said head member, a spring for moving the collar toward said bearing, securing means carried by the collar for binding it on said head member and retractable means in said handle for operatively engaging said securing means when by engagement with said bearing it is in predetermined aligned position.

5. In a bore gauge, relatively movable telescoping members, a handle extending from one of said members, said handle being elongated in cross section in the direction of the axis of said members whereby when hidden from view their relative position may be determined.

6. In a bore gauge, telescoping members means carried by said members for contacting the walls of a bore to be measured, means adjustably secured on one of said members for limiting the expanding movement of said members and movable therewith upon relative contracting movement of said members, means for releasably holding said members in contracted position, and means for expanding said members when said holding means are disengaged whereby a predetermined position of the members may be established.

7. In a bore gauge, telescoping members means carried by said members for contacting the walls of a bore to be measured, an abutment adjustably secured on one of said members for limiting the expanding movement of said members and movable therewith upon relative contracting movement of said members, means for releasably holding said members in contracted position, and means for expanding said members when said holding means are disengaged whereby a predetermined position of the members may be established.

8. In a bore gauge, telescoping members the outer member of which is provided with a closed end extremity, a stop carried by one of said members, an abutment normally in contact with said stop, means for adjustably securing said abutment to the other of said members along the length thereof so as to be movable therewith upon relative movement of the members, means for releasably holding said members in contracted relation, and means for expanding said members when said holding means are disengaged from said members, whereby a predetermined position of the members may be established.

9. In a bore gauge, telescoping members, a stop carried by one of said members, an abutment, resilient means for normally yieldingly holding said abutment in contact with said stop, means for adjustably securing said abutment to the other of said members along the length thereof so as to be movable therewith upon relative contracting movement of the members, means for releasably holding said members in contracted relation, and means for expanding said members when said holding means are disengaged from said members, whereby a predetermined position of the members may be established.

10. In a bore gauge, telescoping members means carried by said members for contacting the walls of a bore to be measured, an abutment adjustably secured to one of said members and movable therewith, a stop carried by the other of said members engageable by said abutment for limiting the relative expanding movement of said members, means for releasably holding said members in contracted position, and means for expanding said members when said holding means are disengaged from said members whereby a predetermined position of the members may be established.

EVERETT H. FERNALD.